No. 641,768. Patented Jan. 23, 1900.
A. W. GRANT.
APPARATUS FOR SETTING RUBBER TIRES.
(Application filed Sept. 25, 1897.)
(No Model.) 2 Sheets—Sheet 1.
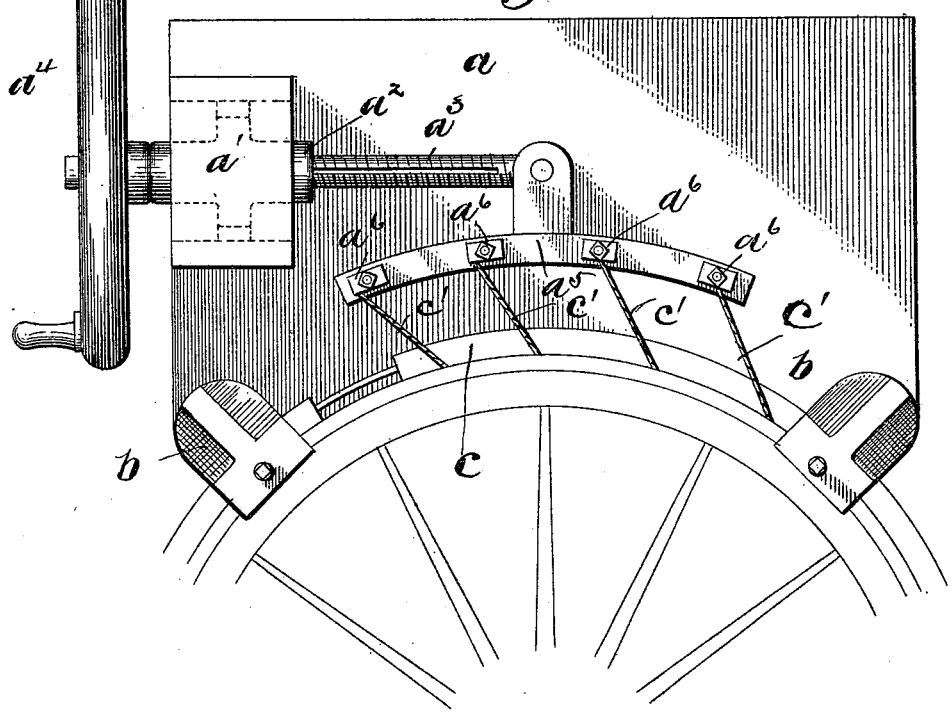
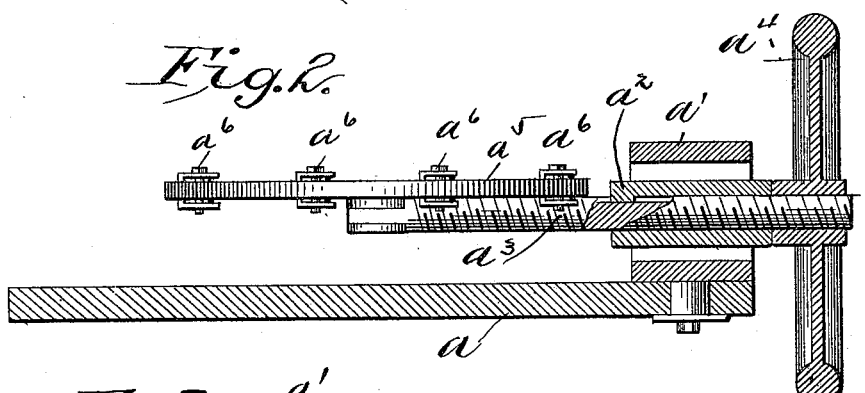
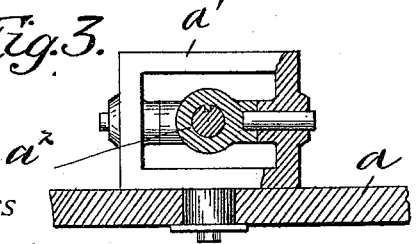
WITNESSES
INVENTOR
Arthur W. Grant
By Paul A. Staley
Attorney No. 641,768. Patented Jan. 23, 1900.
A. W. GRANT.
APPARATUS FOR SETTING RUBBER TIRES.
(Application filed Sept. 25, 1897.)
(No Model.) 2 Sheets—Sheet 2.
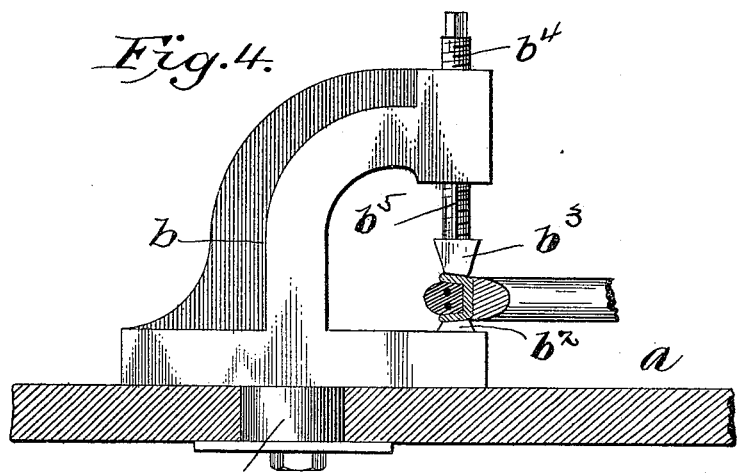
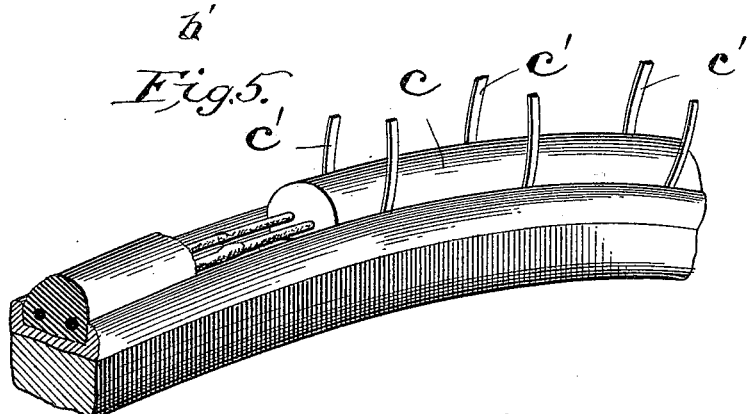
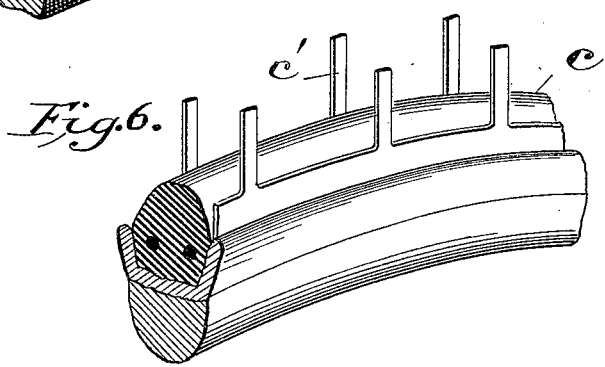
WITNESSES
A. B. Digges
E. E. Masson
INVENTOR
Arthur W. Grant
By Saul N. Phelps
Attorney

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

APPARATUS FOR SETTING RUBBER TIRES.

SPECIFICATION forming part of Letters Patent No. 641,768, dated January 23, 1900.

Application filed September 25, 1897. Serial No. 653,035. (No model.)

*To all whom it may concern:*

Be it known that I, ARTHUR W. GRANT, a citizen of the United States, residing at Springfield, in the county of Clark and State of Ohio, have invented certain new and useful Improvements in Apparatus for Setting Rubber Tires, of which the following is a specification.

My invention relates to improvements in devices for setting rubber tires on vehicle-wheels; and it consists in the constructions and combinations of parts hereinafter described, and set forth in the claims.

In the accompanying drawings, Figure 1 is a plan view of a machine, showing a device embodying my invention. Fig. 2 is a partial elevation of the same. Figs. 3 and 4 are detail views of some of the different parts of the same. Figs. 5, 6, and 7 are detail views illustrating some of the features of the invention and the results attained thereby.

Like parts are represented by similar letters of reference in the several views.

In setting rubber tires, especially those in which the rubber is seated in a channel-iron and held thereon by an encircling band or bands which pass through the rubber, difficulty has been experienced in seating the tire tightly in the channel. If the bands are secured together after the rubber is in place in the channel, an intervening space must be left between the end of the rubber portion of the tire in order to effect the joining of the band or bands, and if the bands are sufficiently tight to hold the rubber in place and prevent its moving in the channel then difficulty has been experienced in closing the joint or space between the ends of the rubber. By the machine invented by me and forming the subject-matter of another pending application I have been enabled to secure rubber tires in channel-rims with any desired degree of tightness and join the ends of the retaining band or bands while the rubber is in the channel.

The present invention relates to the completion of the operation of setting the tires by closing the joint or space left between the ends of the rubber, necessary in order to form the connection between the ends of the retaining band or bands. If the rubber tire is left sufficiently loose to permit the ends to be united in the channel to close this joint, it will be too loose for use. If it is made sufficiently tight to prevent movement in the channel, then it is obvious that it cannot be closed by any ordinary means.

In carrying out my invention I employ flexible supporting and gripping devices, which are inserted into the channel and between the same and the rubber tire before the bands are united or the tire tightened on the wheel-rim. I then employ a device for holding the wheel-rim in connection with means for gripping the flexible supporting devices, in connection with means for forcibly moving said supporting devices, so that the supporting devices and the rubber tire are carried along on the wheel-rim sufficiently to close the joint.

In the accompanying drawings, $a$ represents the bed-plate of a machine which is provided on one side with adjustable clamping devices $b$, which clamping devices are swiveled to the bed-plate, preferably by means of a circular trunnion or projection $b'$, which extends through the bed-plate, so that the clamp can turn thereon. The stationary jaw $b^2$ in the clamp $b$ is arranged opposite the movable jaw $b^3$, the movable jaw $b^3$ having an adjusting-screw $b^4$ and guide-pins $b^5$. Mounted at one end of the bed-plate is a swiveled head $a'$, in which is journaled a supporting-box $a^2$, and in the box there is mounted a screw-threaded rod or shaft $a^3$, on which there is an internally-screw-threaded hand-wheel $a^4$. The screw-threaded shaft $a^3$ is provided with means to prevent its turning in the box $a^2$, and on the opposite end thereof is pivotally mounted a supporting-bar $a^5$. This supporting-bar $a^5$ is preferably curved on the arc of a circle which corresponds substantially to the curve of the wheels upon which the tires to be operated upon are mounted, and it is provided, preferably, at intervals along its length with clamping devices $a^6$.

As before stated, when the tires are secured to the rim they are supplied with flexible supporting devices between the tires and the rim, as shown at $c$ in Fig. 5. For this purpose I preferably employ pieces of soft wire placed at intervals corresponding approximately to the intervals between the clamping devices $a^6$. Any other form of flexible supporting device, however, may be used, and it is possible to use a single supporting device or a greater or less number than shown so long as the supporting device or devices are sufficiently flexible to clamp the tire in operation and to permit its removal after the completion of the operation and also have the quality of supporting or partially supporting the tires on the rim, so that the supporting devices will travel on the rim, and thus relieve the tire of the friction against the rim. The parts being in position as shown in Fig. 5, the wheel is placed on the bed-plate with that portion of the periphery adjacent to the joint in the rubber in proximity to the clamp nearest the supporting-head $a'$. The clamps $b\ b$ are then tightened so that the rim is clamped between the stationary jaws $b^2$ and the movable jaws $b^3$, thus holding the wheel immovable on the bed-plate. The supporting devices $c$ are then connected to the movable bar $a^5$ by the aid of the clamping devices $a^6$. The bar $a^5$ is then caused to travel approximately around the periphery of the wheel by turning the hand-wheel $a^4$. The box $a^2$ being journaled to the head $a'$ and the head $a'$ being journaled to the plate $a$ forms a universal joint which will permit the adjusting-screw $a^3$ to move to any position necessary to accomplish this result, the bar $a^5$, by reason of its pivotal connection with the screw $a^3$, being also permitted to follow substantially the periphery of the wheel, while the screw moves in a different line.

It should, perhaps, be mentioned that after the supporting devices are placed in the tire the tire or that portion of it which is supported by these devices is compressed lengthwise, so that a sufficient amount of rubber is provided to close up the joint, the amount of compression being greatest at the ends of the rubber and gradually less to the first one of the supporting devices. In the operation of closing the joint, and thus setting the tire, the bar $a^5$ is advanced, and where several supporting devices are used the supporting device farthest from the joint is released first. The next in order is then released, and so on, so that the supporting device nearest the joint is the last released. The result of this operation is that the compression in this part of the tire is utilized in the closing of this joint, so that when the joint is completely closed the compression is substantially uniform throughout the tire.

It will be seen that as the bar moves the supporting devices by reason of their flexibility will be clamped firmly around the tire and hold the same effectively. They will also furnish supports for the rubber and relieve the rubber from the friction which would otherwise result from the friction of the rubber on the rims.

In Fig. 6 I have shown the holding devices $c'$ in the form of a web, which passes entirely under the rubber portion of the tire, and when so constructed it may be made of flexible material, such as canvas or similar substance. After the joint is properly closed these holding or supporting devices will in the case of the wires be removed by cutting off one end and gradually working the wire out with ordinary pliers. In the case of the fabric it may be removed in a similar way or the outside cut off and the inside remain.

Having thus described my invention, I claim—

1. In a machine for setting rubber tires flexible supports arranged and adapted to be placed between the tire and its channel, engaging devices for said supports and means substantially as described for moving the engaging devices approximately in line with the periphery of the tire, substantially as specified.

2. In a machine for setting rubber tires, a bed or support, wheel-clamps thereon, flexible supports arranged and adapted to be placed between the tire and channel, engaging devices to engage the supports and means for forcibly moving said engaging devices, substantially as specified.

3. The combination with a frame or support having wheel-holding devices, of a traveling bar having gripping devices, flexible connections engaged by said gripping devices and connected to the tire, and means, substantially as described, for moving said bar, as and for the purpose specified.

4. The combination with the frame or support, swiveled clamps thereon, a swiveled head on said support, and a movable bar having gripping devices, a screw-threaded shaft connected to said bar, and means engaged by said gripping devices for connecting the movable bar to the tire, substantially as specified.

5. In a machine for setting rubber tires, wheel-holding means, tire-supports to extend between the tire and the rim, engaging devices for said supports, and means for forcibly moving said engaging devices, substantially as specified.

6. In combination with pulling devices, flexible metallic supports arranged and adapted to be placed between a rubber tire and its channel, substantially as and for the purpose set forth.

In testimony whereof I have hereunto set my hand this 16th day of September, A. D. 1897.

ARTHUR W. GRANT.

Witnesses:
JNO. S. GREEN,
CHARLES I. WELCH.